Figure 1:
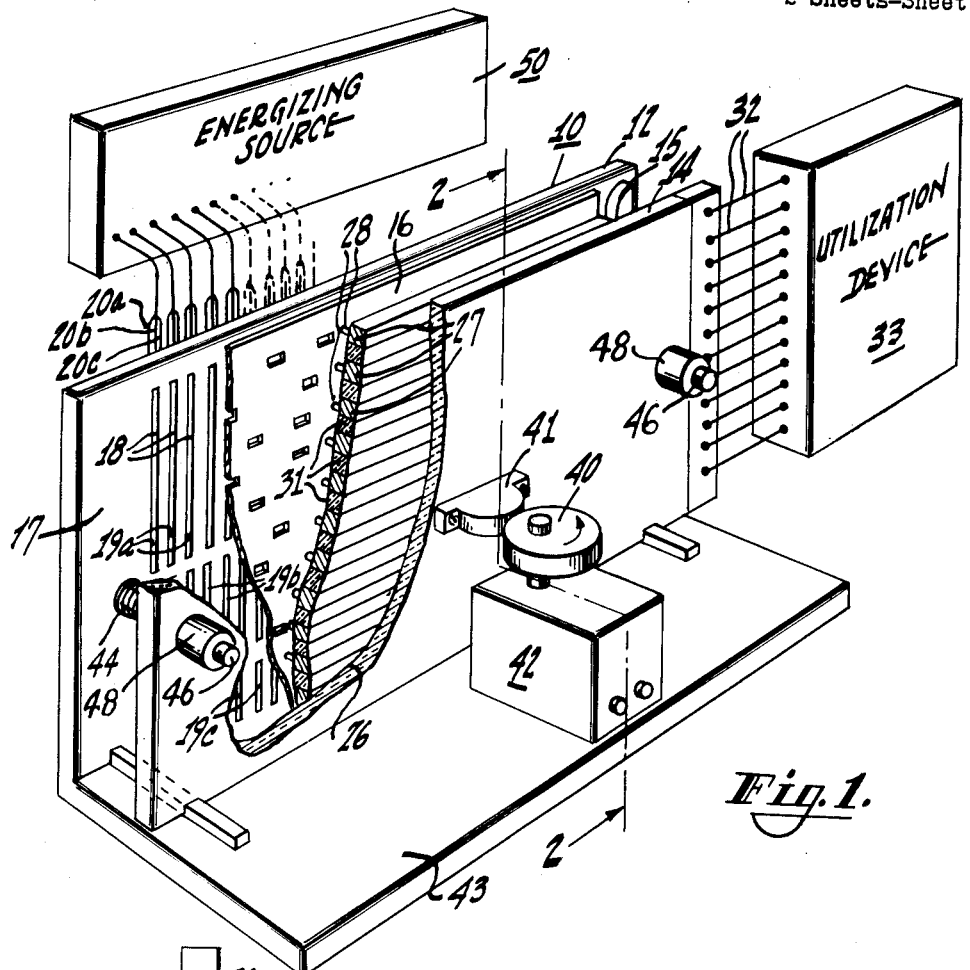

Aug. 10, 1965    J. P. HAMMEL    3,200,240
PERFORATED RECORD MEMBER SENSING APPARATUS
Filed Dec. 7, 1960    2 Sheets-Sheet 1

INVENTOR.
JOHN P. HAMMEL
BY John V. Regan
ATTORNEY

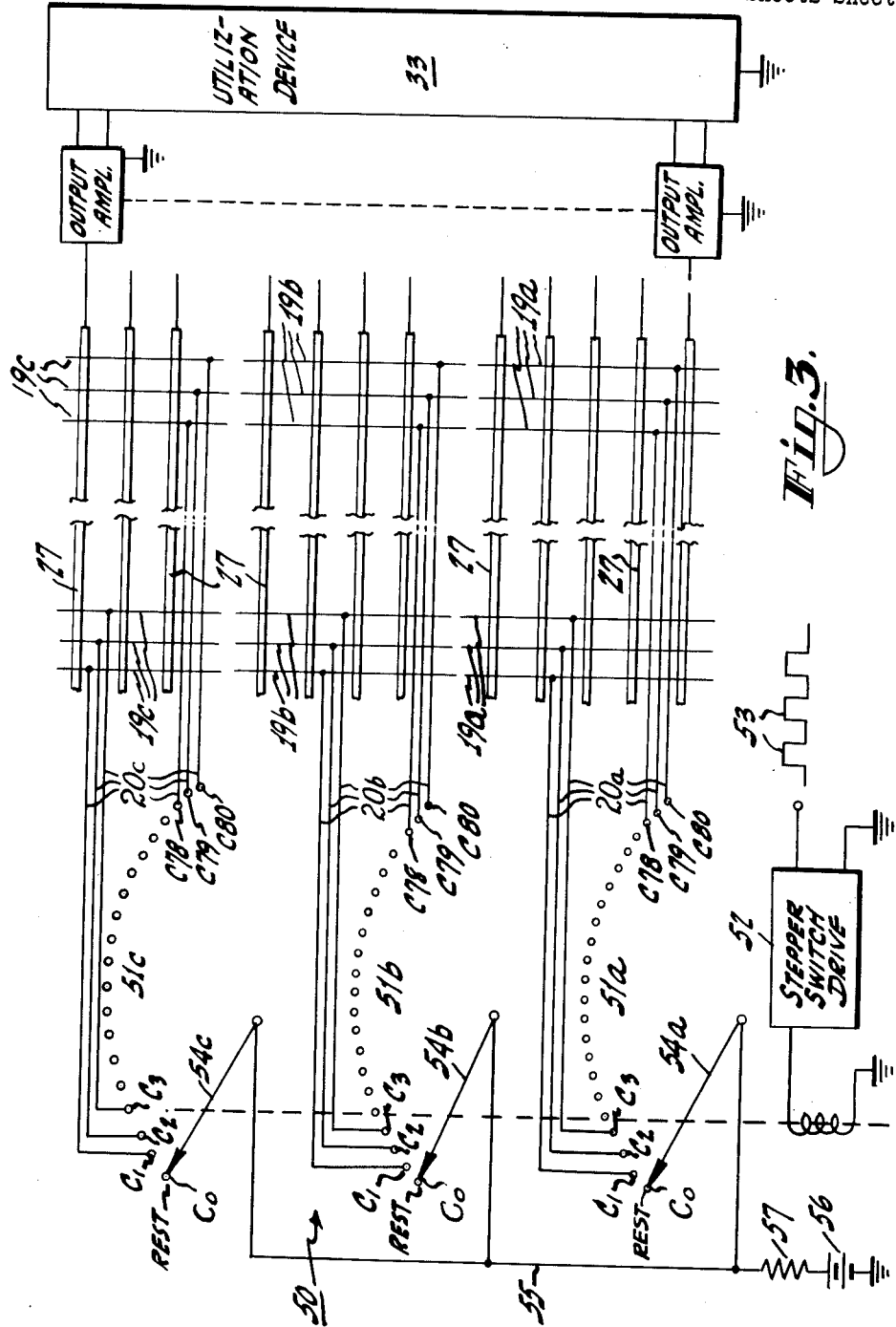

United States Patent Office 3,200,240
Patented Aug. 10, 1965

3,200,240
PERFORATED RECORD MEMBER SENSING APPARATUS
John P. Hammel, San Jose, Calif., assignor to Radio Corporation of America, a corporation of Delaware
Filed Dec. 7, 1960, Ser. No. 74,311
1 Claim. (Cl. 235—61.11)

This invention relates to perforated record member sensing devices, and more particularly to novel and improved means for sensing perforations in a record member.

Prior art record sensing devices for perforated record members such as business machine cards or tape are relatively complicated and expensive. A common type of sensing device employs mechanical brushes which provide a positive sensing action, but which are subject to wear and reliability problems due to the moving mechanical elements. Another common type employs a group of light responsive devices such as phototransistors or photocells for sensing a group of storage positions on the member. The latter apparatus, although of high speed and not subject to the mechanical wear problem, is relatively expensive and requires relatively complicated electronic circuitry.

It is an object of this invention to provide an improved perforated member sensing apparatus which provides a positive sensing, as with contact brushes, but which does not require moving mechanical sensing elements.

It is a further object of this invention to provide a perforated member sensing device which has very few moving parts and which can rapidly sense a record member.

It is another object of this invention to provide a sensing device which is capable of high speed sensing of a record member.

It is still another object of this invention to provide an improved perforated record member sensing apparatus which is simple and economical to manufacture and which is efficient in use.

According to one form of this invention, a record member sensing apparatus includes a pair of plates between which a record member to be read is positioned. One plate has strips of resilient, electrically conductive material arranged, for example, in rows on one surface thereof. The other plate has strips of electrically conductive material arranged in columns. The rows and column arrangements on the plates conform with the rows and columns of perforations in the record member to be read. The record member to be read is inserted between the pair of plates and the plates are forced together. The row strips contact the column strips through the respective perforations in the record member. The column strips are then scanned serially by an electric distributor and an output signal is taken across the row strips. An output is produced across the row strips only when a completed circuit is produced from the scanning device through the column and the row strips via a perforation in the member.

According to one feature of the invention, conductive rubber is used for the resilient strips, the strips having protrusions extending from the surfaces of these strips to provide an improved contacting operation.

According to another form of the invention, strips of a relatively soft conductive rubber are mounted on a sheet of relatively hard conductive rubber to provide advantages with respect to wear on the card surface.

Figure 2:
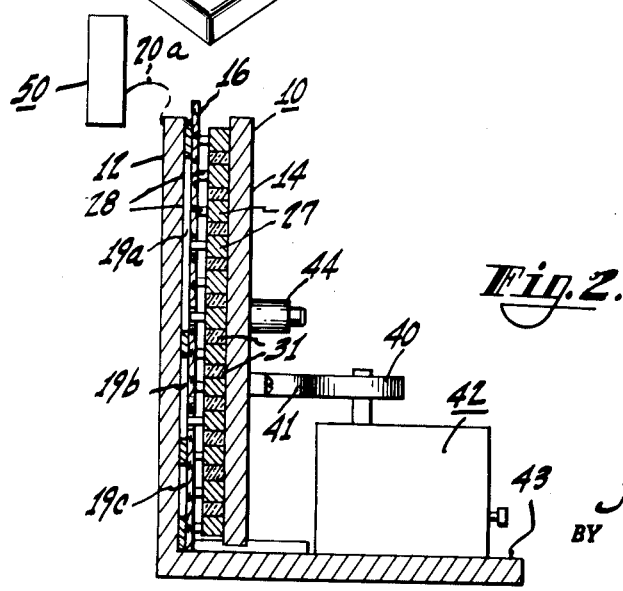

The novel features of this invention, both as to its organization and operation, as well as additional objects and advantages thereof, will be understood more fully from the following description when read in connection with the accompanying drawing, in which:

FIG. 1 is a perspective view, partly broken away in section, of an embodiment of a sensing apparatus according to the present invention, FIG. 2 is a cross-sectional view of the device shown in FIG. 1 taken along the line 2—2 of FIG. 1, and FIG. 3 is a circuit diagram showing one arrangement for scanning the record member using the apparatus of FIG. 1.

Referring now to FIGS. 1 and 2, a card reader 10 is illustrated which is designed for reading an eighty column and a twelve row card member using an information recording code such as the one illustrated on page 25 of the book "High Speed Data Processes" by Gotlieb & Hume, published by McGraw-Hill, 1958. The sensing apparatus, however, is readily used with other arrangements of perforated cards. The card reader 10 is constructed with two plates 12 and 14 between which a record member in the form of a card 16 is inserted. The back plate 12 is stationary, is constructed of electrical insulating material, and is slightly larger in area than the card 16. One surface 17 of the back plate 12 is formed with eighty separate sets of grooves 18 respectively aligned with the eighty columns of information areas in the card 16. Conductive strips 19 of rubber are positioned respectively in each of the grooves 18. A suitable conductive rubber is one impregnated with graphite particles. The strips 19 are recessed in the grooves 18 below the surface 17 so that a card 16 can be easily inserted between the plates 12 and 14 without coming into contact with the strips 19. A guide 15 attached to the stationary plate 12 is used in positioning the card in the sensing apparatus. In the particular embodiment illustrated, each strip 19 is separated into three separate segments 19a, 19b, and 19c of different lengths in order to accommodate the three different sections of perforations in each column in the card information code heretofore described. It will be understood that different arrangements of column strips may be used for different card codes. For example, each column strip 19 may be one continuous strip for card codes using one perforation in each column. Leads 20a, 20b, and 20c connect the segments 19a, 19b, and 19c, respectively, to an electrical scanning source to be hereinafter described.

Spaced from the plate 12 and parallel thereto is the plate 14 which is also constructed of insulating material and is movable relative to the stationary plate 12 as described more fully hereinafter. Fixed to one surface 26 of the plate 14 are twelve elongated row strips 27 of electrically conductive, resilient material such as conductive rubber. Preferably, each of the strips 27 has a plurality of protrusions 28 extending from one surface thereof. Further, the protrusions are preferably smaller in cross-section than the perforations in the card 16 in order to provide a substantial clearance or tolerance in aligning the card 16 for proper reading. The size of the perforations in the card can be reduced if the protrusions are very small in cross-section. Each protrusion 28 is aligned with a separate column and row coordinate position in the card 16. The row conductors 27 and protrusions 28 may be formed by any suitable, resilient material having electrically conducting properties, such as graphite impregnated conductive rubber or conductive plastic. Also, the protrusions 28 may be of a relatively soft conductive material and the strips 27 of a relatively hard conductive material. For example, the degree of hardness of the rubber can be controlled in known manner by the amount of graphite impregnated therein. Insulating strips 31 are positioned between each of the conductors 27 so as to prevent electrical leakage therebetween. Output leads 32 connect each of the row conductors 27 to a utilization device 33, such as a sensing amplifier in a digital computer or any other suitable device. In the case of the three segmented columns, three separate sensing amplifiers are used.

Positioned adjacent the movable plate 14 is a cam 40 for forcing the movable plate 14 towards the stationary plate 12. As illustrated in FIGS. 1 and 2, the cam 40 is in contact with a cam follower 41 which is connected to the movable plate 14. The cam 40 is driven by a motor 42 which rests on a base 43. A pair of compression springs 44 are positioned between the opposed surfaces of the plates 12 and 14 around guide pins 46 mounted on the plate 12 and slidably received in bushings 48 mounted on the plate 14 to bias the plates apart when pressure is not being applied to the movable plate 14 by the cam 40.

Connected to the eighty columns leads 20a, 20b and 20c is an energizing source 50 of the distributor type as shown in FIG. 3. The source 50 contains three, similar, eighty-one position stepping switches 51a, 51b, and 51c driven by a stepper switch drive 52 which is magnetically coupled to the switches. A series of eighty control pulses 53 from any suitable source actuates the stepper switch drive 52 at set intervals of time, thereby moving the stepper switch arms 54a, 54b, and 54c in synchronism from the rest position C₀ to contacts C1, C2, and so forth, through the eighty positions on the stepper switches 51a, 51b, and 51c. Connected to the switch arms 54a, 54b, and 54c, by means of a lead 55, is a constant current source, such as a battery 56 and a series resistor 57, for providing constant current when perforations are sensed in the card.

In operation, a card 16 to be read is placed between the two plates 12 and 14. The card 16 makes contact with an actuating switch (not shown) located on the base 43 which actuates the motor 42, thereby turning the cam 40 and forcing the plate 14 into contact with the plate 12. The same switch may be used to actuate the pulse source which generates the stepping switch pulses. Wherever there is a perforation in the card 16, the protrusion 28 located adjacent thereto will project through and make contact with the column strip 19 located on the opposite side of the card 16. At the information areas where there are no perforations, the card 16 serves as an insulator between the protrusions 28 and the column strips 19.

When a first pulse 53 is applied to the stepper switch drive 52, the switch arms 54a, 54b and 54c move to a first position C1. The source 56 is thus connected to the first three contact positions C1. This source signal is carried by the leads 20a, 20b and 20c to the first three segments 19a, 19b and 19c of the first column of the stationary plate 12.

Wherever there is a perforaton in any one of the first column segments 19a, 19b and 19c, an electrical signal is transfered through the corresponding protrusion 28 and row conductor 27 to the sensing amplifier for the corresponding segment. The sensing amplifier output is applied to the utilization device 33. After a certain interval of time, a second pulse 53 actuates the stepper switch drive 52, thereby moving the arms 54a, 54b and 54c to the C2 position, and the second column of the card is read in the same manner. The stepping pulses 53 continue to transfer the source voltage through the stepper switches from one column to the next until the entire card or pattern has been sensed. After stepping through the eighty contact positions, the stepper switch arms 54a, 54b and 54c are returned to the rest position C₀ by suitable circuitry of conventional type. The same circuitry can be used to actuate the motor 42 to rotate the cam 40 to release the pressure against the movable plate 14. The plates 12 and 14 are then separated by means of the compression springs 44. The card 16 can then be removed.

What is claimed is:

Apparatus for sensing perforations in a record member having an array of rows and columns of perforations comprising a pair of parallel plates, one of said plates having columns of electrically conductive strips affixed to one surface thereof, the other of said plates having rows of resilient, electrical conductors affixed to one of its surfaces in predetermined relation to said strips, one surface of each of said resilient conductors being formed with a plurality of protrusions, each said protrusion on each said conductor being aligned with a different one of said columns of conductive strips, each of said protrusions being rod-like and extending in a direction perpendicular to said one plate, each of said protrusions also having dimensions perpendicular to its length less than the corresponding dimensions of said perforations, guide means for aligning a perforated record member between said plates, means for moving said conductors in a rectilinear manner towards said one plate to force said protrusions into contact with said strips through related ones of the perforations in said record member, and means connected to said strips and said resilient conductors to sense said perforations when a voltage is applied across said resilient conductors and strips.

References Cited by the Examiner

UNITED STATES PATENTS

| | | | |
|---|---|---|---|
| 2,475,335 | 7/49 | Paris | 235—61.11 |
| 3,042,299 | 7/62 | Sherman | 235—61.11 |
| 3,105,895 | 10/63 | Lyon | 235—61.11 |

MALCOLM A. MORRISON, *Primary Examiner.*

CORNELIUS D. ANGEL, *Examiner.*